(12) United States Patent
Lv et al.

(10) Patent No.: US 10,198,196 B2
(45) Date of Patent: Feb. 5, 2019

(54) MONITORING HEALTH CONDITION OF A HARD DISK

(71) Applicant: EMC Corporation, Hopkinton, MA (US)

(72) Inventors: Man Lv, Beijing (CN); Chris Zirui Liu, Beijing (CN); Colin Yong Zou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/672,921

(22) Filed: Mar. 30, 2015

(65) Prior Publication Data

US 2015/0277797 A1    Oct. 1, 2015

(30) Foreign Application Priority Data

Mar. 31, 2014    (CN) .......................... 2014 1 0135820

(51) Int. Cl.
*G06F 3/06* (2006.01)
*G06F 11/30* (2006.01)
*G06F 11/22* (2006.01)

(52) U.S. Cl.
CPC ............ *G06F 3/0619* (2013.01); *G06F 3/061* (2013.01); *G06F 3/0655* (2013.01); *G06F 3/0665* (2013.01); *G06F 3/0688* (2013.01); *G06F 3/0689* (2013.01); *G06F 11/2221* (2013.01); *G06F 11/30* (2013.01)

(58) Field of Classification Search
None
See application file for complete search history.

(56) References Cited

U.S. PATENT DOCUMENTS

| | | | | |
|---|---|---|---|---|
| 7,373,559 | B2* | 5/2008 | Guha | G06F 11/008 |
| | | | | 714/54 |
| 2005/0228946 | A1* | 10/2005 | Gotoh | G06F 3/0617 |
| | | | | 711/114 |
| 2007/0079170 | A1* | 4/2007 | Zimmer | G06F 11/008 |
| | | | | 714/6.23 |
| 2009/0259749 | A1* | 10/2009 | Barrett | G06F 11/3495 |
| | | | | 709/224 |
| 2011/0191407 | A1 | 8/2011 | Fu et al. | |
| 2013/0061087 | A1* | 3/2013 | Kopylovitz | G06F 11/106 |
| | | | | 714/6.3 |
| 2015/0205657 | A1* | 7/2015 | Clark | G06F 11/008 |
| | | | | 714/47.3 |
| 2015/0286546 | A1* | 10/2015 | Brethauer | G01F 15/16 |
| | | | | 714/6.3 |

* cited by examiner

*Primary Examiner* — Tracy C. Chan
(74) *Attorney, Agent, or Firm* — BainwoodHuang

(57) ABSTRACT

Various embodiments of the present disclosure provide a method and apparatus for monitoring health condition of a hard disk by obtaining full-dimensional characteristics associated with the hard disk, wherein the full-dimension characteristics comprise at least two of: hard disk performance information, data integrity information, input/output I/O correctness information, and a hard disk Self-Monitoring Analysis and Reporting Technology S.M.A.R.T. report, and determining the health condition of the hard disk based on the full-dimension characteristics.

20 Claims, 5 Drawing Sheets

MONITORING HEALTH CONDITION OF A HARD DISK

RELATED APPLICATION

This application claims priority from Chinese Patent Application Number CN201410135820.1 filed on Mar. 31, 2014 entitled "METHOD AND APPARATUS FOR MONITORING THE HEALTH CONDITION OF A HARD DISK" the content and teachings of which is herein incorporated by reference in its entirety.

FIELD OF TECHNOLOGY

Various embodiments of the present disclosure relate to the field of storage systems.

BACKGROUND OF THE INVENTION

In a storage system, e.g., in a personal storage product or enterprise storage product, a hard disk is the most frequently replaced field replaceable unit. A typical problem encountered by storage vendors is that: some of the hard disks that are returned from the field may have been tested with a good performance. The reason being that storage vendors make such decisions of failing a hard disk in accordance with single-sourced health data provided by the hard disk, for example, only in accordance with the collected S.M.A.R.T. (Self-Monitoring Analysis and Reporting Technology) report or I/O (input/output) operation error statistics of the hard disk. However, the single-sourced health data may not be sufficient to reflect overall health condition of the hard disk, and the decision made according to the single-sourced health data causes a hard disk that may be operating perfectly, to be replaced. Such erroneous judgment will cause increase of an erroneous judgment rate on the hard disk's health condition and thereby cause frequent replacement of hard disks and increase of costs, and also cause other parts in the storage system that may have actually failed not to be replaced in time. Another problem resulting from deciding whether the hard disk should be replaced according to the single-sourced health data is a missing judgment of hard disk errors.

SUMMARY OF THE INVENTION

In view of some of the technical problems existing in the prior art, various embodiments of the present disclosure provide a method and apparatus for monitoring health condition of a hard disk.

BRIEF DESCRIPTION OF THE DRAWINGS

Through the following detailed description with reference to the accompanying drawings, the above and other objects, features and advantages of embodiments of the present disclosure will become more comprehensible. In the drawings, several embodiments of the present disclosure will be illustrated in an example and non-limiting manner, wherein.

DETAILED DESCRIPTION

Figure 1:
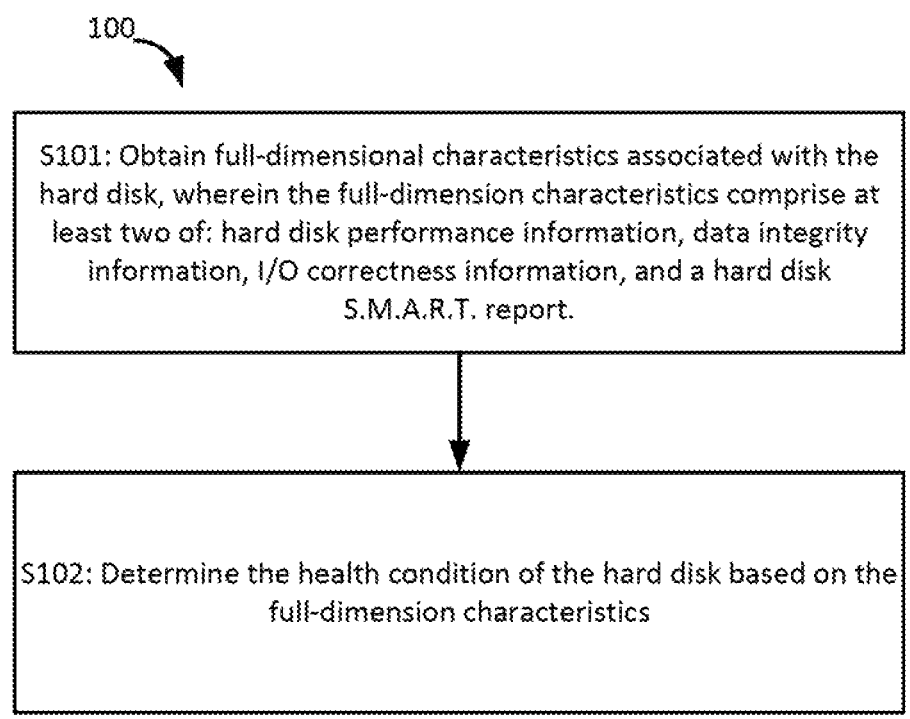
FIG. 1 illustrates an exemplary flow chart of a method for monitoring health condition of a hard disk according to an embodiment of the present disclosure.

Principles and spirit of the present disclosure will be described with reference to several exemplary embodiments as illustrated in the figures. It should be appreciated that description of these embodiments is only intended to enable those skilled in the art to better understand and further implement the present disclosure, and not to limit the scope of the present disclosure in any manner. Various embodiments of the present disclosure relate to the field of storage systems, and more specifically for monitoring health condition of a hard disk by improving accuracy of judgment of the health condition.

In current schemes for detecting health condition of a hard disk, only the health data originating from a hard disk (e.g., S.M.A.R.T. data) may be used as the basis of evaluation of hard disk health condition and to determine whether or not to replace the hard disk, which may cause erroneous judgment or missing judgment on the hard disk health condition. The reason may be because a single-sourced hard disk health data may not reflect all aspects of the hard disk health condition. When malfunction occurs in other parts of the storage system rather than the hard disk, it may be possible to cause the health data originating from the hard disk to indicate an unhealthy operation state of the hard disk itself.

Based on the above considerations, the solution of the present disclosure desires to comprehensively consider full-dimension characteristics that may affect a judgment of the hard disk health condition upon determining whether the hard disk fails and whether it should be replaced, so as to improve accuracy of judgment.

It should be noted that, the term "hard disk" used herein may include solid state disk (SSD), hard disk hard disk (HDD), solid state hybrid hard disk (SSHD) or other similar types of storage devices. The scope of the present disclosure is not limited in this regard. A hard disk may be a portion of a storage system of a computer, a server or other computing devices.

According to a first embodiment of the present disclosure, there is provided a method for monitoring health condition of a hard disk. The method comprises obtaining full-dimensional characteristics associated with a hard disk, wherein the full-dimension characteristics comprise at least two of: hard disk performance information, data integrity information, input/output I/O correctness information, and a hard disk Self-Monitoring Analysis and Reporting Technology S.M.A.R.T. report. The method further comprises determining the health condition of the hard disk based on the full-dimension characteristics.

In a further embodiment of the present disclosure, the hard disk performance information is obtained from a host bus adapter HBA drive program corresponding to the hard disk. In another embodiment of the present disclosure, the hard disk performance information includes at least one of: average I/O latency, I/O through put, an average I/O size and a proportion of an I/O pattern, wherein the I/O pattern includes a sequential read/write pattern and a random read/write pattern.

In a further embodiment of the present disclosure, the data integrity information is obtained from Redundant Array of Independent Disks RAID corresponding to the hard disk. In another embodiment of the present disclosure, the data integrity information includes statistics results of data integrity verified by the RAID. In a further embodiment of the present disclosure, the method further comprises obtaining the data integrity information from an upper layer system of the RAID.

In a further embodiment of the present disclosure, the I/O correctness information is obtained from at least one of a HBA drive program and a small computer system interface SCSI protocol layer corresponding to the hard disk. In another embodiment of the present disclosure, the I/O correctness information includes at least one of: HBA hardware/firmware-related errors, link-related errors and hard disk medium-related errors.

In an embodiment of the present disclosure, the hard disk S.M.A.R.T. report is obtained from the hard disk. In another embodiment of the present disclosure, the hard disk S.M.A.R.T. report is associated with the type of the hard disk.

In a further embodiment of the present disclosure, the method further includes pre-collecting the full-dimension characteristics periodically or according to triggering by an event; and storing the full-dimension characteristics. In yet a further embodiment of the present disclosure, determining the health condition of the hard disk based on the full-dimension characteristics comprises: determining the health condition of the hard disk periodically based on the full-dimension characteristics; or determining the health condition of the hard disk based on the full-dimension characteristics according to triggering by an event.

According to a further embodiment of the present disclosure, there is provided an apparatus for monitoring health condition of a hard disk. The apparatus comprises an obtaining unit for obtaining full-dimensional characteristics associated with the hard disk, wherein the full-dimension characteristics comprise at least two of: hard disk performance information, data integrity information, input/output I/O correctness information, and a hard disk Self-Monitoring Analysis and Reporting Technology S.M.A.R.T. report. The apparatus further comprises a determining unit for determining the health condition of the hard disk based on the full-dimension characteristics.

In a further embodiment of the present disclosure, the hard disk performance information is obtained from a host bus adapter HBA drive program corresponding to the hard disk. In another embodiment of the present disclosure, the hard disk performance information includes at least one of: average I/O latency, I/O through put, an average I/O size and a proportion of an I/O pattern, wherein the I/O pattern includes a sequential read/write pattern and a random read/write pattern.

In a further embodiment of the present disclosure, the data integrity information is obtained from Redundant Array of Independent Disks RAID corresponding to the hard disk. In another embodiment of the present disclosure, the data integrity information includes statistics results of data integrity verified by the RAID. In a further embodiment of the present disclosure, the data integrity information is further obtained from an upper layer system of the RAID.

In a further embodiment of the present disclosure, the I/O correctness information is obtained from at least one of a HBA drive program and a small computer system interface SCSI protocol layer corresponding to the hard disk. In another embodiment of the present disclosure, the I/O correctness information includes at least one of: HBA hardware/firmware-related errors, link-related errors and hard disk medium-related errors.

In a further embodiment of the present disclosure, the hard disk S.M.A.R.T. report is obtained from the hard disk. In another embodiment of the present disclosure, the hard disk S.M.A.R.T. report is associated with the type of the hard disk.

In a further embodiment of the present disclosure, the apparatus further includes a collecting unit for pre-collecting the full-dimension characteristics periodically or according to triggering by an event; and a storage unit for storing the full-dimension characteristics. In a further embodiment of the present disclosure, the determining unit is further used to determine the health condition of the hard disk periodically based on the full-dimension characteristics; or determine the health condition of the hard disk based on the full-dimension characteristics according to triggering by an event. In one embodiment, the obtaining unit, the determining unit and the collecting unit may be combined into a single analysis unit (not shown in Figure), which may be configured to collectively perform the tasks of each of these individual units to monitor the health condition and improve accuracy of judgment of the health condition.

FIG. 1 illustrates an exemplary flow chart of a method 100 for monitoring health condition of a hard disk according to an embodiment of the present disclosure. It should be appreciated that the method 100 may further comprise additional steps and/or omit execution of a shown step. The scope of the present disclosure is not limited in this regard.

It should be noted that an entity for executing the method 100 may be a computing device itself including the hard disk, or other devices separate from the computing device.

In step S101, full-dimension characteristics associated with the hard disk are obtained, wherein the full-dimension characteristics comprise at least two of the following parameters listed below: hard disk performance information, data integrity information, I/O correctness information, and a hard disk S.M.A.R.T. report. Other parameters may be added to this list and should not bring about any limitations for functions and use scope of embodiments of the present disclosure.

In the embodiment of the present disclosure, it is desired to evaluate whether the health condition of the hard disk is good with data in all aspects of the hard disk comprehensively considered. Therefore, the full-dimension characteristics associated with the hard disk may be obtained. Reasons for considering various parameters in the full-dimension characteristics will be analyzed as follows:

Hard disk performance information—it is expected that a hard disk with a good health condition has a reasonable throughput and latency;

Data integrity information—it is expected that a hard disk with a good health condition is able to store and retrieve data correctly;

I/O correctness information—it is expected that a hard disk with a good health condition is able to execute input/output operations correctly;

The hard disk S.M.A.R.T. report—the hard disk S.M.A.R.T. report includes data about all aspects directly related to the hard disk that are collected by the hard disk itself, such as sectors of the hard disk, powering on and powering off of the hard disk and/or the like, and the hard disk S.M.A.R.T. report may assist in evaluating the hard disk health condition.

Specific contents and acquisition paths of various parameters of the above full-dimension characteristics will be described in more detail with reference to FIG. 2 and FIG. 3.

Figure 2:
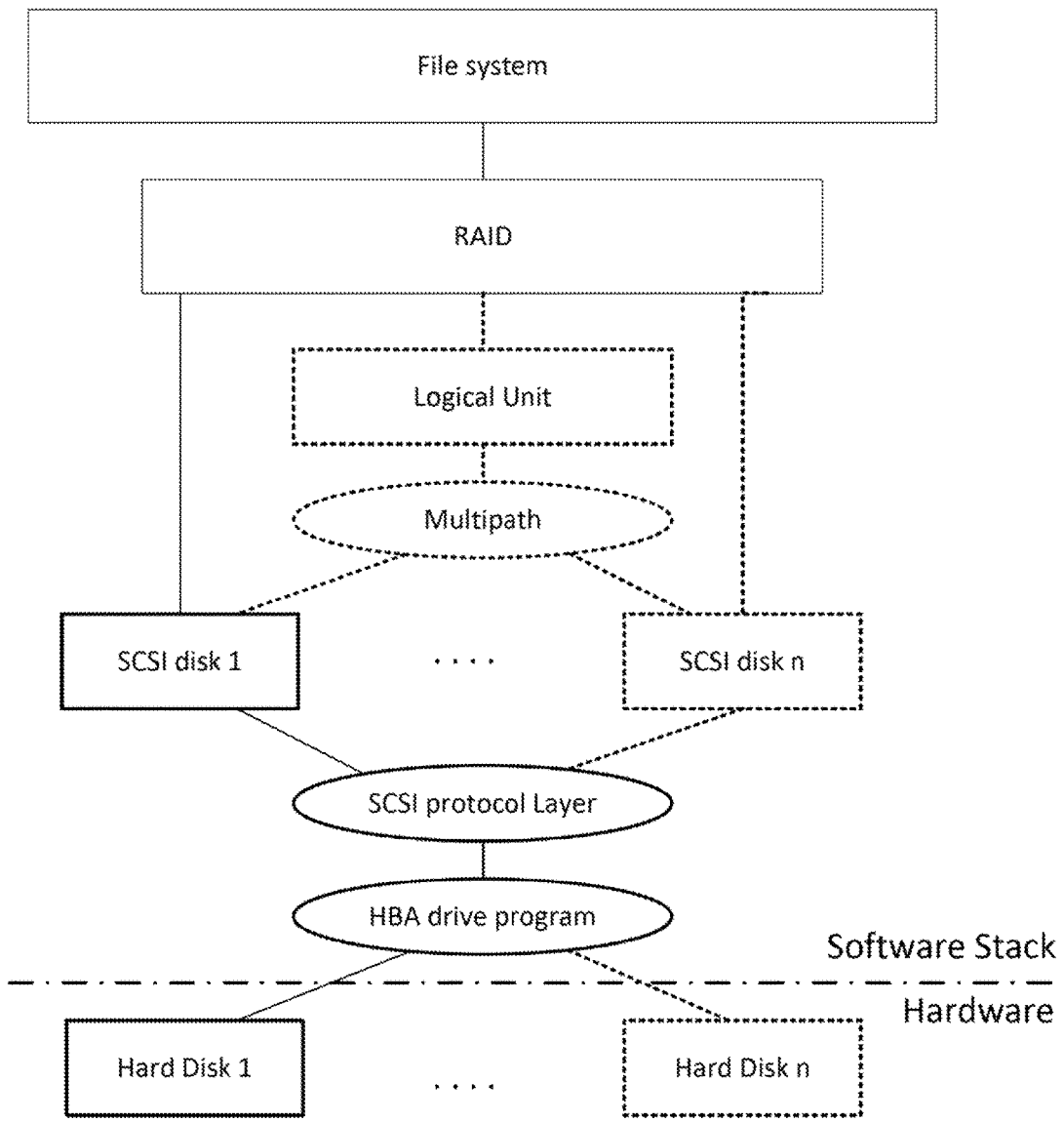
FIG. 2 illustrates an exemplary block diagram of an exemplary storage system suitable for implementing embodiments of the present disclosure.

FIG. 2 illustrates an exemplary block diagram of an exemplary storage system suitable for implementing embodiments of the present disclosure. FIG. 3 illustrates an exemplary schematic view for retrieving full-dimension characteristics in the exemplary storage system of FIG. 2. In FIG. 2 and FIG. 3, dotted-line boxes or dotted lines refer to optional parts or connections in the storage system. The storage system shown in FIG. 2 and FIG. 3 is only one example, and should not bring about any limitations for functions and use scope of embodiments of the present disclosure.

In the block diagram of the exemplary storage system shown in FIG. 2, the hardware portion may comprise one or more hard disks (Hard Disk 1 to Hard Disk n). For each hard disk, the full-dimension characteristics may be obtained to determine the health condition of the hard disk. Acquiring the full-dimension characteristics will be described by taking one hard disk (e.g., Hard Disk 1) as an example.

(1) Hard disk performance information is obtained from a HBA (Host Bus Adapter) drive program corresponding to the hard disk.

The hard disk performance information is required to reflect performance condition of the hard disk more accurately, and is not expected to be affected by other parts of the storage system. Hence, the hard disk performance information should be obtained from a lower layer of the software stack. It can be seen from the block diagram of the storage system shown in FIG. 2 that the HBA drive program layer is closest to the hard disk. Accordingly, in an embodiment, the hard disk performance information may be obtained from the HBA drive program. In other embodiments, the hard disk performance information may further be obtained from other layers of the software stack, e.g., from the SCSI (Small Computer System Interface) protocol layer.

Factors related to the hard disk performance at least comprises I/O latency and throughput, wherein I/O latency refers to latency time amount of a writing/reading operation, which is related to I/O size and I/O pattern. The I/O size refers to data size obtained by a writing/reading operation. The I/O pattern comprises a sequential read/writing pattern and a random read/write pattern. Therefore, in an embodiment, the hard disk performance information includes at least one of: average I/O latency, I/O through put, average I/O size and a proportion of an I/O pattern, wherein the I/O pattern proportion refers to a proportion of each of the sequential read/write pattern and the random read/write pattern.

Each parameter included in the hard disk performance information is determined according to at least one of the following raw information: a total I/O count, a total READ count, a total WRITE count, a total non-RW count, total I/O service time for READ I/O, total I/O service time for WRITE I/O, total I/O service time for non-RW, a read amount of total sectors, a write amount of total sectors, a random writing operation count, and a sequential reading operation count, wherein the total I/O count refers to number of times of read, write, or non-RW operation of the hard disk from the ex-factory time to the present. The total I/O service time for READ refers to service time for total reading operations. The total I/O service time for WRITE I/O and the total I/O service time for non-RW I/O refer to similar meaning.

The above raw material may be collected by the HBA drive program or SCSI protocol layer according to a counter included therein, and respective parameters included in the hard disk performance information may be calculated based on this raw information.

(2) The data integrity information is obtained from RAID (Redundant Array of Independent Disks) corresponding to the hard disk.

The data integrity information is used to reflect whether the data obtained from the storage system correct and has integrity. Usually, the RAID in the storage system has a capacity to detect data integrity. When data reaches the RAID, the RAID may verify data correctness and generate information/data of verification result. Hence, analysis may be carried out for the number of times of correct data or number of times of wrong data.

In other embodiments, the data integrity information may be obtained from an upper layer system of the RAID. For example, in the storage system shown in FIG. 2, the data integrity information may be obtained from a file system at the upper layer of the RAID, wherein the data integrity information is statistic results about data integrity verified by the upper system of the RAID. The data integrity information obtained from the upper layer system of the RAID may be used in combination with the data integrity information obtained from the RAID, or only one of the two may be used. The embodiment of the present disclosure is not specifically limited in this regard.

(3) The I/O correctness information is obtained from at least one of the HBA drive program and the SCSI protocol layer corresponding to the hard disk.

The I/O correctness information refers to correctness or error of an I/O path which is taken in the course of reading data from or writing data to the hard disk. The I/O correctness information includes at least one of: HBA hardware/firmware-related errors, link-related errors and hard disk medium-related errors.

The HBA drive program and SCSI protocol layer in the software stack are respectively aware of a portion of parameters included by the I/O correctness information. Besides, other parts of the storage system may also monitor the I/O correctness information. The HBA drive program may know whether the I/O operation reaches the hard disk correctly and whether a result can be correctly obtained from the hard disk. For example, regarding the writing operation, it is related to whether data to be written can be written into the hard disk; regarding the reading operation, it is related to whether data to be read can be obtained from the hard disk. The SCSI protocol layer may know whether the I/O operation is correctly executed by the hard disk.

Various parameters of the I/O correctness information are described as follows:

a) HBA Hardware/Firmware-Related Errors

This type of errors may be detected by the HBA drive program. For example, when the HBA drive program finds a problem in the interaction operation with the hard disk, the hard disk will return "NO-CONNECT" error with regard to the I/O operation sent to the hard disk. When the HBA drive program detects that the hard disk is resetting, the hard disk will return a resetting error ("DID_RESET") with regard to the I/O operation sent to the hard disk. This type of errors may further include the following specific error codes:

i. DID_NO_CONNECT ii. DID_BUS_BUSY iii. DID_TIME_OUT
iv. DID_BAD_TARGET
v. DID_ABORT
vi. DID_PARITY
vii. DID_ERROR
viii. DID_RESET The above error codes all are error codes used by the SCSI protocol layer of Linux operation system. Those skilled in the art may appreciate specific corresponding situations of the above error codes and appreciate that besides the above-listed error codes, similar or other error codes may also exist in different systems.

b) Link-Related Errors

Link-related errors are errors occurring on an input/output link, e.g., a link between parts. The part that can report these types of error depends on the part detecting these errors parameters. For example, if the hard disk detects a CRC (Cyclic Redundancy Check) error, the hard disk may return a message indicating the CRC error. If the HBA drive program detects an error, an error code such as DID_NO_CONNECT or DID_RESET may be returned. If an expander in the storage system detects an error and the expander simply drops a command or data being executed currently, the I/O will time out; and a time out error will be returned.

c) Hard Disk Media-Related Errors

Errors that may be reported through a sense key or sense data report are categorized into the hard disk media-related errors. The hard disk media-related errors usually comprise medium errors and hardware errors. Errors of this type are related to hard disk vendors, hard disk models and hard disk firmware versions.

The HBA drive program, SCSI protocol layer or other relevant parts may make data/information of a total error number of each of the above types of parameters or the number of each specific error, and regard the resulting data as the I/O correctness information.

(4) The hard disk S.M.A.R.T. report is obtained from the hard disk.

The hard disk usually can make data/information of and records the S.M.A.R.T. report. In one embodiment, the S.M.A.R.T. report is associated with the type of the hard disk. In other embodiments, the S.M.A.R.T. report is associated with the hard disk itself. Common types of hard disks include a SATA (Serial Advanced Technology Attachment) type and a SAS (Serial Attached SCSI) type. Besides, there may be other types of hard disks. Examples of S.M.A.R.T. report in the SATA type and SAS type of hard disks are presented in the following as an example.

a) The S.M.A.R.T report of the SATA type hard disks generally includes the following parameters: a reallocated sector count, raw read error, a CRC error count, temperature, a start and stop count, seek error, a number of power cycles, a reallocated event count and a current pending sector count, etc.

All of the above parameters are well-known by those skilled in the art, for example, the temperature refers to the current temperature of the hard disk; the start and stop count refers to data of a cycle from starting to rotate to stopping the rotating; the seek error refers to data of errors occurring when a sector is positioned by a magnetic head of the hard disk; the number of power cycles refers to times of the powering on/powering off of the hard disk, and/or the like.

b) The S.M.A.R.T report of the SAS type hard disk generally includes the following parameters: a permanent list (Permanent-list), a growth list (Growth-list), BMS (Background Medium Scan) log data.

The permanent list refers to data of unavailable sectors of the hard disk upon the ex-factory time, and the growth list refers to data of unavailable sectors of the hard disk during in the course from the ex-factory time to the current use time. BMS log data may include the total time of power on, the number of scans performed, a BMS total log count and BMS range days (number of days between the first and last BMS entry), a recovered error count, a medium error count, and other error count (all other sensed errors), wherein the BMS total log count refers to times that a log needs to be recorded due to occurrence of error every time the BMS scan is performed. The recovered error count, medium error count and other error count are data of relevant errors monitored by the hard disk.

Acquisition paths and specific contents of various parameters included in the full-dimension characteristics of the hard disk have been introduced in the above. As illustrated in FIG. 3, paths for acquiring parameters included in the full-dimension characteristics are illustrated. The parameters included in the full-dimension characteristics vary continually over time. Hence, for purpose of convenience in subsequently utilizing the full-dimension characteristics to analyze the hard disk's health condition, in an embodiment according to the present disclosure, the full-dimension characteristics may be pre-collected periodically or according to trigger from/by an event, and may be stored. In this embodiment, a collecting cycle for various parameters included in the full-dimension characteristics may either be the same or different, and even a collecting cycle for each item of content included in the hard disk performance information, the data integrity information, the I/O correctness information and the hard disk S.M.A.R.T report may either be the same or different. Besides, in this embodiment, the full-dimension characteristics may not be collected according to the collecting cycle, and instead, the collection of any parameter included in the full-dimension characteristics is triggered when this parameter changes substantially.

The pre-collected full-dimension characteristics may be stored in a corresponding storage area. If the full-dimension characteristics are pre-stored in a certain storage area, the full-dimension characteristics are then obtained from this storage area. Otherwise, the full-dimension characteristics are obtained from corresponding parts of the storage system (such as, the HBA drive program, the hard disk, the SCSI protocol layer and the RAID).

It should be appreciated that not all of the hard disk performance information, data integrity information, I/O correctness information and hard disk S.M.A.R.T. report is obtained, but at least two or more items thereof may be obtained. Not all of the contents respectively included in the hard disk performance information, data integrity information, I/O correctness information and hard disk S.M.A.R.T. report are obtained, but at least a part of the respectively-included content may be obtained. The embodiments of the present disclosure are not limited in this regard.

Figure 3:
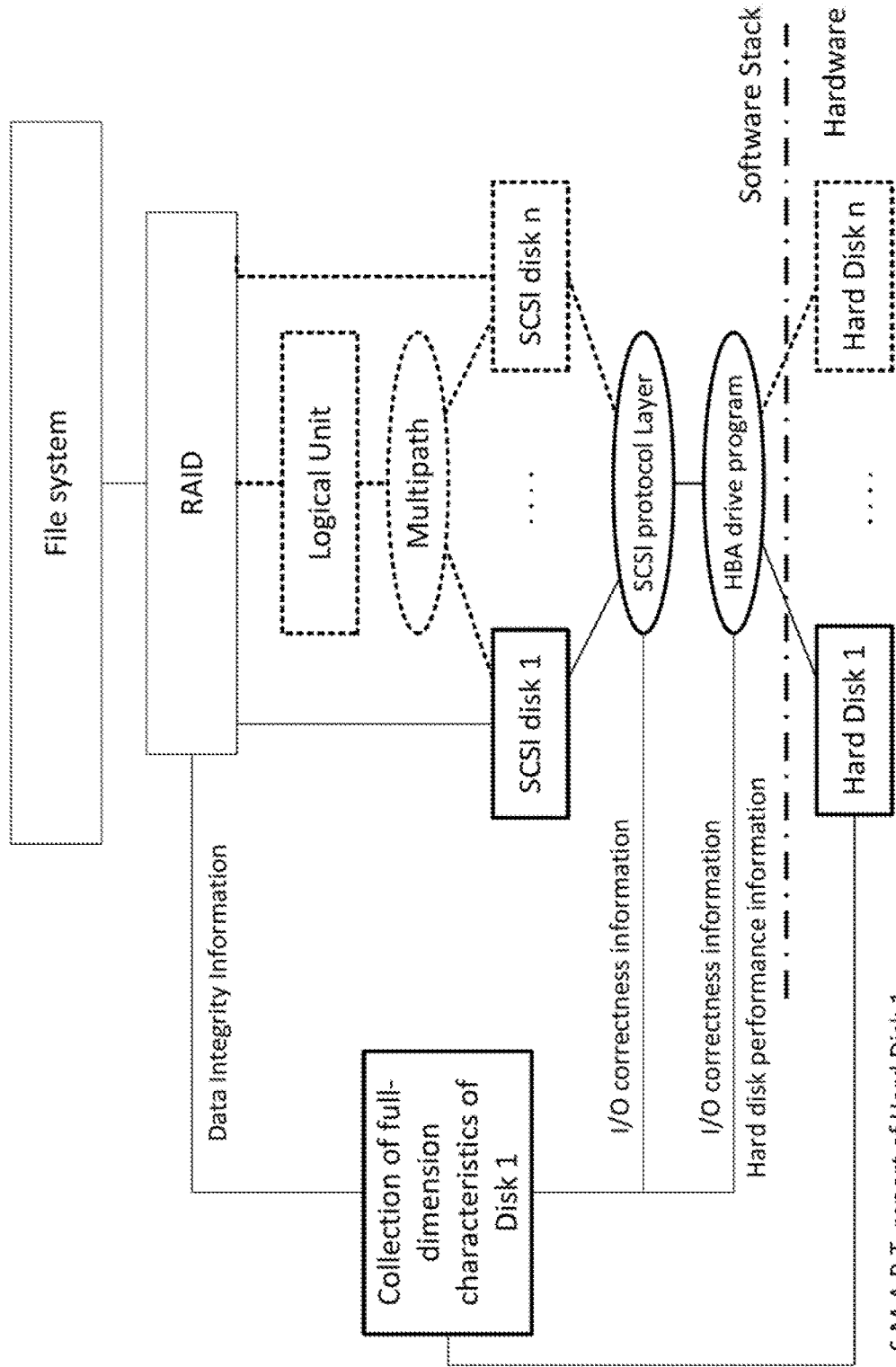
FIG. 3 illustrates an exemplary schematic view for retrieving full-dimension characteristics in the exemplary storage system of FIG. 2.

It should be noted that a block diagram of a storage system suitable for implementing the method of the present disclosure is only schematically illustrated in FIG. 2 and FIG. 3. Those skilled in the art may also implement various embodiments of the present disclosure in other storage systems. Besides, as for other multiple hard disks of the storage system, the health conditions thereof may be determined according to the method provided by various embodiments of the present disclosure.

After obtaining the full-dimension characteristics associated with the hard disk, the method 100 proceeds to step S102. In step S102, the health condition of the hard disk is determined based on the full-dimension characteristics.

As the full-dimension characteristics reflect conditions in many aspects of the hard disk, the health condition of the hard disk may be evaluated thoroughly based on the full-dimension characteristics in order to make a decision on whether the hard disk should be replaced or not. In embodiments according to the present disclosure, the health condition of the hard disk may be determined periodically based on the full-dimension characteristics; or the health condition of the hard disk may be determined based on the full-dimension characteristics according to a trigger from/by an event, wherein the determination according to the trigger means that the determination of the hard disk's health conditions based on the full-dimension characteristics has been triggered when the storage system plans to replace the hard disk as being confronted with I/O problems.

Figure 4:
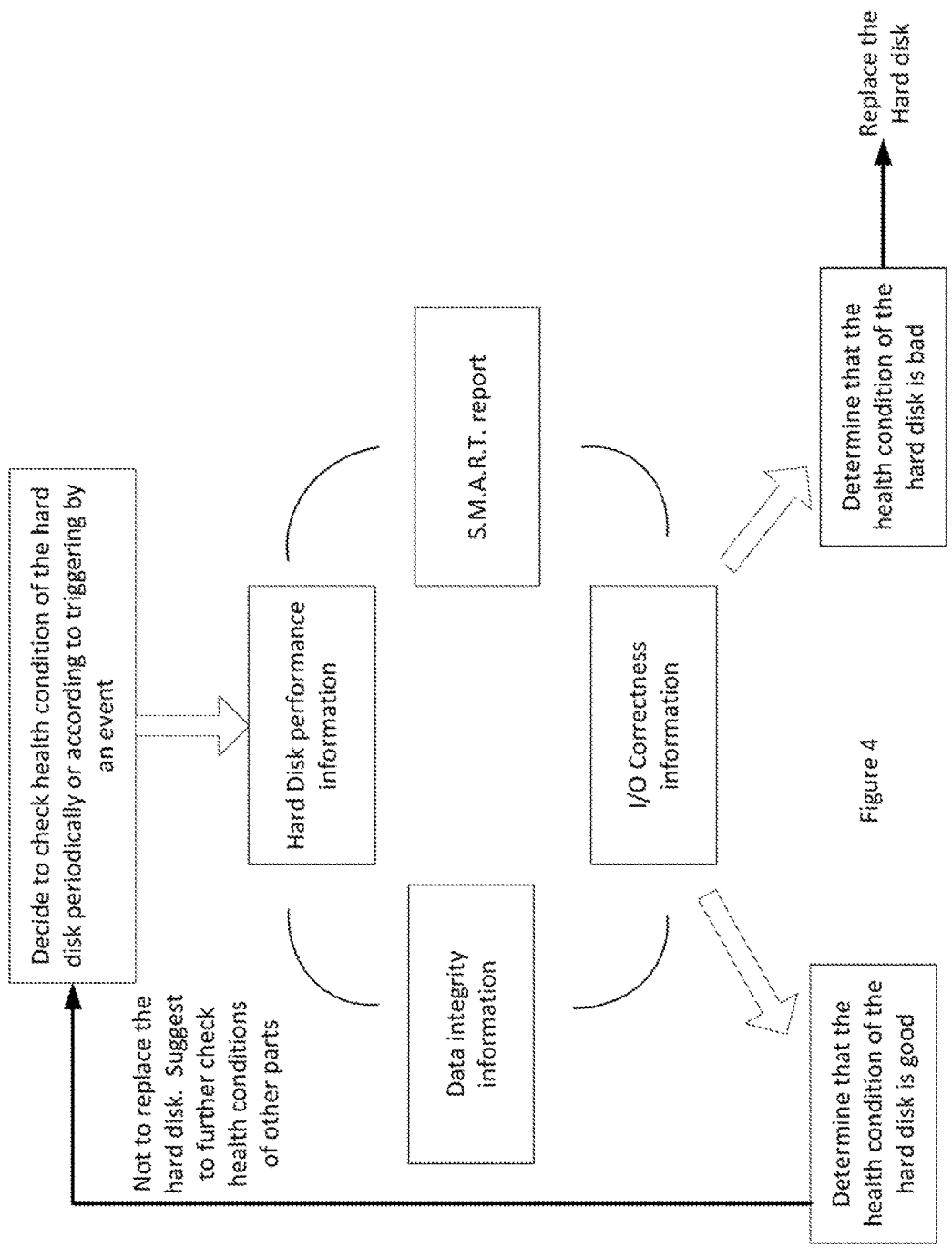
FIG. 4 illustrates an exemplary flow chart of determining health condition of a hard disk based on full-dimension characteristics according to an embodiment of the present disclosure.

Reference is made to FIG. 4, which illustrates an exemplary flow chart of determining the health condition of the hard disk based on the full-dimension characteristics according to an embodiment of the present disclosure. In this embodiment of the present disclosure, the full-dimension characteristics are considered comprehensively. However, the embodiment of the present disclosure does not impose additional limitations of how to specifically decide whether the hard disk should be replaced based on the full-dimension characteristics. Only several examples are presented with respect to this aspect.

In an example, the hard disk S.M.A.R.T. report is first detected and verified. If several parameters in the S.M.A.R.T. report exceed a predetermined threshold, it is determined that the hard disk should be replaced. If parameters in the S.M.A.R.T. report all do not exceed the predetermined threshold, it is decided whether various parameters of the I/O correctness information exceed a predetermined threshold. If various parameters of the I/O correctness information do not exceed the predetermined threshold, a decision will be further made as to whether various parameters of the data integrity information exceed a predetermined threshold. If several parameters of the data integrity information exceed the predetermined threshold, it is determined that the hard disk should be replaced.

In another example, a decision is made to whether various parameters of the I/O correctness information exceed a predetermined threshold, and the DID_RESET count of the I/O correctness information is determined to have exceeded the predetermined threshold, then the hard disk is determined to be in an excellent health condition and a problem might exist on the I/O path of the storage system.

In a further example, if all parameters in the S.M.A.R.T. report are determined as not exceeding a predetermined threshold and all parameters in the I/O correctness information and data integrity information are determined as not exceeding a predetermined threshold, the hard disk performance information may be judged. If the I/O latency in the hard disk performance information exceeds a predetermined threshold, it may be determined that the hard disk should be replaced. In these examples, the predetermined threshold for each parameter may be either the same or different.

It should be appreciated that only several examples about determining the health condition of the hard disk based on all parameters in the full-dimension characteristics are presented herein. In other examples, upon determining the hard disk's health condition, not all parameters included in the full-dimension characteristics are used, or the order for all parameters to be judged may not conform to the order as given in the above examples, but may adopt other sequential orders. The scope of the present invention is not limited in this aspect.

Further, it should be appreciated that for a storage system having a plurality of hard disks, the full-dimension characteristics associated with each hard disk may be obtained by the method described in the above, and the hard disk's health condition may be determined based on its full-dimension characteristics, thereby achieving the monitoring of health conditions of multiple hard disks in the storage system.

The spirit and principles of the present disclosure are set forth in the above with reference to several specific embodiments. Through various embodiments of the present disclosure in the above, evaluating the hard disk's health condition based on the full-dimension characteristics reflecting multiple aspects of hard disks may reduce the erroneous judgment rate on the health condition of the hard disk, such that a hard disk replacement frequency is lowered and thereby having a lower associated replacement cost, and other parts in the storage system that actually fail can be found in time/in advance and can be appropriately fixed. Besides, hard disk errors can be captured more thoroughly so as to reduce the missing judgment rate.

Figure 5:
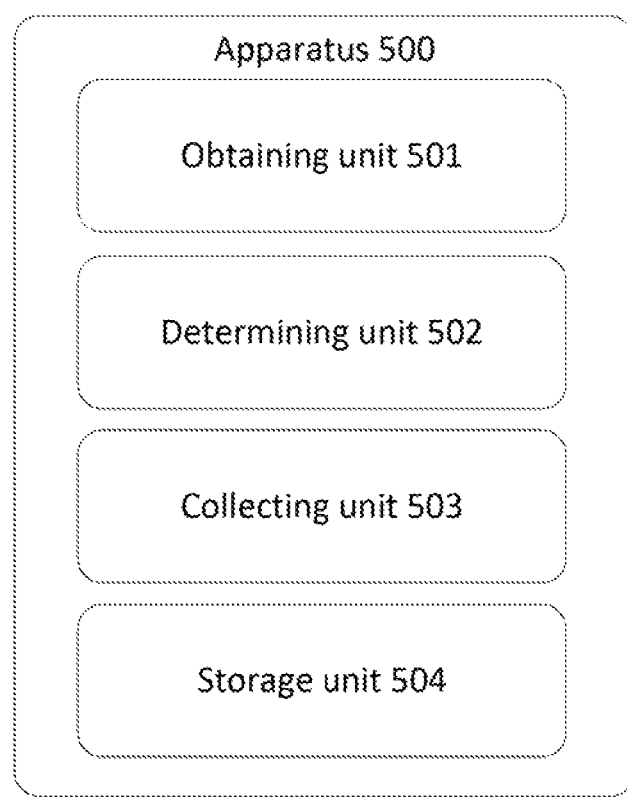
FIG. 5 illustrates an exemplary block diagram of an apparatus for monitoring health condition of a hard disk according to an embodiment of the present disclosure.

FIG. 5 shows a block diagram of an apparatus 500 for monitoring health condition of a hard disk according to an embodiment of the present disclosure. The apparatus 500 may be a computing device itself including the hard disk to be detected, or a part of the computing device. The apparatus 500 may further be an independent device separate from the computing device.

As shown in FIG. 5, the apparatus 500 comprises an obtaining unit 501 for obtaining full-dimensional characteristics associated with the hard disk, wherein the full-dimension characteristics comprise at least two of: hard disk performance information, data integrity information, input/output I/O correctness information, and a hard disk Self-Monitoring Analysis and Reporting Technology S.M.A.R.T. report. The apparatus 500 further comprises a determining unit 502 for determining the health condition of the hard disk based on the full-dimension characteristics.

In an embodiment of the present disclosure, the hard disk performance information is obtained from a host bus adapter HBA drive program corresponding to the hard disk. In another embodiment of the present disclosure, the hard disk performance information includes at least one of: average I/O latency, I/O through put, an average I/O size and a proportion of an I/O pattern, wherein the I/O pattern includes a sequential read/write pattern and a random read/write pattern.

In an embodiment of the present disclosure, the data integrity information is obtained from Redundant Array of Independent Disks RAID corresponding to the hard disk. In another embodiment of the present disclosure, the data integrity information includes data/information that results of data integrity verified by the RAID. In a further embodiment of the present disclosure, the data integrity information is further obtained from an upper layer system of the RAID.

In an embodiment of the present disclosure, the I/O correctness information is obtained from at least one of a HBA drive program and a small computer system interface SCSI protocol layer corresponding to the hard disk. In another embodiment of the present disclosure, the I/O correctness information includes at least one of: HBA hardware/firmware-related errors, link-related errors and hard disk medium-related errors.

In an embodiment of the present disclosure, the hard disk S.M.A.R.T. report is obtained from the hard disk. In another embodiment of the present disclosure, the hard disk S.M.A.R.T. report is associated with the type of the hard disk.

In an embodiment of the present disclosure, the apparatus 500 further comprises a collecting unit 503 for pre-collecting the full-dimension characteristics periodically or according to triggering by an event; and a storage unit 504 for storing the full-dimension characteristics.

In an embodiment of the present disclosure, the determining unit 502 is further used to determine the health condition of the hard disk periodically based on the full-dimension characteristics; or determine the health condition of the hard disk based on the full-dimension characteristics according to triggering by an event. In one embodiment, obtaining unit 501, determining unit 502, collecting unit 503 and storage unit 504 may be combined into a single unit, such as an analysis unit (not shown in Figure), which may be configured to collectively perform the tasks of each of these individual units to monitor the health condition and improve accuracy of judgment of the health condition and required replacement of the hard disks and/or other elements of the system.

It can be seen that the apparatus 500 of FIG. 5 may implement the method as shown in FIG. 1, and although not further illustrated, the apparatus 500 may comprise more functional units to implement a plurality of embodiments described in combination with the method 100 of FIG. 1. Furthermore, the apparatus 500 may evaluate the health condition of the hard disk based on the full-dimension characteristics reflecting multiple aspects of hard disks and may reduce the erroneous judgment rate on the hard disk's health condition such that a hard disk replacement frequency is lowered and the replacement cost falls, and other parts in the storage system that are actually failed can be found in time.

It should be noted that, the embodiments of the present disclosure can be implemented by software, hardware or the combination thereof. The hardware part can be implemented by a special logic; the software part can be stored in a memory and executed by a proper instruction execution system such as a microprocessor or a design-specific hardware. Those of ordinary skilled in the art may understand that the above apparatus and method may be implemented by using a computer-executable instruction and/or by being included in a processor control codes, for example, such codes are provided on a carrier medium such as a magnetic disk, CD, or DVD-ROM, or a programmable memory such as a read-only memory (firmware) or a data carrier such as an optical or electronic signal carrier. The apparatuses and their modules in the present disclosure may be implemented by hardware circuitry of a programmable hardware device such as super-large integrated circuit or gate array, a semiconductor such as logical chip or transistor, or a field-programmable gate array, or a programmable logical device, or implemented by software executed by various kinds of processors, or implemented by the combination of the above hardware circuitry and software, for example firmware.

It should be noted that although a plurality of means or sub-means of the apparatus have been mentioned in the above detailed depiction, such partitioning is merely non-compulsory. In fact, according to the embodiments of the present disclosure, the features and functions of the above described two or more means may be embodied in one means. In turn, the features and functions of the above described one means may be further divided and embodied by a plurality of means.

Besides, although operations of the method of the present disclosure are described in a particular sequence in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution.

Although the present disclosure has been depicted with reference to a plurality of embodiments, it should be understood that the present disclosure is not limited to the disclosed embodiments. The present disclosure intends to cover various modifications and equivalent arrangements included in the spirit and scope of the appended claims. The scope of the appended claims meets the broadest explanations and thus covers all such modifications and equivalent structures and functions.

What is claimed is:

1. A method for monitoring health condition of a hard disk in a storage system, the method comprising:
    obtaining characteristics associated with a hard disk from a host bus adapter (HBA) configured to transport data between the hard disk and a bus, wherein the characteristics comprise at least two of:
    hard disk performance information, data integrity information, input/output I/O correctness information, and a hard disk Self-Monitoring Analysis and Reporting Technology S.M.A.R.T. report, wherein the characteristics are obtained from the HBA to avoid obtaining the hard disk performance information affected by a higher layer of a software stack operating on the storage system;
    wherein the I/O correctness information refers to correctness or error of an I/O path which is taken in the course of reading data from or writing data to the hard disk, wherein the I/O correctness information is enabled to be collected from the small computer system interface SCSI protocol layer and the HBA; and
    determining a health condition of the hard disk based on the characteristics to avoid an erroneous assessment of the health condition of the hard disk based on the S.M.A.R.T report.

2. The method according to claim 1, wherein the hard disk performance information includes at least one of:
    average I/O latency, I/O throughput, an average I/O size and a proportion of an I/O pattern, wherein the I/O pattern includes a sequential read/write pattern and a random read/write pattern.

3. The method according to claim 1, wherein the data integrity information is obtained from a Redundant Array of Independent Disks (RAID) corresponding to the hard disk, and the data integrity information obtained from an upper layer system of the RAID.

4. The method according to claim 1, wherein the data integrity information includes information of data integrity verified by the RAID.

5. The method according to claim 1, wherein the I/O correctness information is obtained from at least one of an HBA drive program and a small computer system interface SCSI protocol layer corresponding to the hard disk, and wherein the I/O correctness information includes at least one of:
    HBA hardware/firmware-related errors, link-related errors and hard disk medium-related errors.

6. The method according to claim 1, wherein the hard disk S.M.A.R.T. report is obtained from the hard disk wherein the hard disk S.M.A.R.T. report is associated with the type of the hard disk.

7. The method according to claim 1, wherein before obtaining the characteristics associated with the hard disk, the method comprising:
   pre-collecting the characteristics periodically or according to a trigger by an event; and
   storing the characteristics.

8. The method according to claim 7, wherein determining the health condition of the hard disk based on the characteristics comprises at least one of:
   determining the health condition of the hard disk periodically based on the characteristics; OR
   determining the health condition of the hard disk based on the characteristics according the trigger by an event.

9. An apparatus for monitoring health condition of a hard disk in a storage system, comprising:
   an analysis unit configured for obtaining characteristics associated with a hard disk from a host bus adapter (HBA) configured to transport data between the hard disk and a bus, wherein the characteristics comprise at least two of:
   hard disk performance information, data integrity information, input/output I/O correctness information, and a hard disk Self-Monitoring Analysis and Reporting Technology S.M.A.R.T. report, wherein the characteristics are obtained from the HBA to avoid obtaining the hard disk performance information affected by a higher layer of a software stack operating on the storage system;
   wherein the I/O correctness information refers to correctness or error of an I/O path which is taken in the course of reading data from or writing data to the hard disk, wherein the I/O correctness information is enabled to be collected from the small computer system interface SCSI protocol layer and the HBA; and
   determining the health condition of the hard disk based on the characteristics to avoid an erroneous assessment of the health condition of the hard disk based on the S.M.A.R.T report.

10. The apparatus according to claim 9, wherein the hard disk performance information includes at least one of:
   average I/O latency, I/O throughput, an average I/O size and a proportion of an I/O pattern, wherein the I/O pattern includes a sequential read/write pattern and a random read/write pattern.

11. The apparatus according to claim 9, wherein the data integrity information is obtained from a Redundant Array of Independent Disks (RAID) corresponding to the hard disk, and wherein the data integrity information is further obtained from an upper layer system of the RAID.

12. The apparatus according to claim 9, wherein the data integrity information includes statistics results of data integrity verified by the RAID.

13. The apparatus according to claim 9, wherein the I/O correctness information is obtained from at least one of a HBA drive program and a small computer system interface SCSI protocol layer corresponding to the hard disk, and wherein the I/O correctness information includes at least one of: HBA hardware/firmware-related errors, link-related errors and hard disk medium-related errors.

14. The apparatus according to claim 9, wherein the hard disk S.M.A.R.T. report is obtained from the hard disk, and wherein the hard disk S.M.A.R.T. report is associated with the type of the hard disk.

15. The apparatus according to claim 9, further configured for
   pre-collecting the characteristics periodically or according to a trigger by an event; and
   storing the characteristics.

16. The apparatus according to claim 15, comprises at least one of determining the health condition of the hard disk periodically based on the characteristics; OR determining the health condition of the hard disk based on the characteristics according to the trigger by an event.

17. A computer program product for facilitating management of resources, the computer program product being tangibly stored on a non-transient computer-readable medium and comprising machine executable instructions which, when executed, causing the machine to perform a method for monitoring health condition of a hard disk in a storage system, comprising:
   obtaining characteristics associated with a hard disk from a host bus adapter (HBA) configured to transport data between the hard disk and a bus, wherein the characteristics comprise at least two of:
   hard disk performance information, data integrity information, input/output I/O correctness information, and a hard disk Self-Monitoring Analysis and Reporting Technology S.M.A.R.T. report, wherein the characteristics are obtained from the HBA to avoid obtaining the hard disk performance information affected by a higher layer of a software stack operating on the storage system, and
   wherein the hard disk performance information is obtained from a host bus adapter (HBA) drive program corresponding to the hard disk, and wherein the hard disk performance information includes at least one of: average I/O latency, I/O throughput, an average I/O size and a proportion of an I/O pattern, wherein the I/O pattern includes a sequential read/write pattern and a random read/write pattern;
   wherein I/O correctness information is obtained from at least one of the HBA drive program and a small computer system interface SCSI protocol layer corresponding to the hard disk, and wherein the I/O correctness information includes at least one of: HBA hardware/firmware-related errors, link-related errors and hard disk medium-related errors, wherein the I/O correctness information is enabled to be collected from the small computer system interface SCSI protocol layer and the HBA;
   wherein the I/O correctness information refers to correctness or error of an I/O path which is taken in the course of reading data from or writing data to the hard disk;
   wherein the hard disk S.M.A.R.T. report is obtained from the hard disk wherein the hard disk S.M.A.R.T. report is associated with the type of the hard disk; and
   determining a health condition of the hard disk based on the characteristics to avoid an erroneous assessment of the health condition of the hard disk based on the S.M.A.R.T report.

18. The computer program product to claim 17, wherein the data integrity information is obtained from a Redundant Array of Independent Disks (RAID) corresponding to the hard disk, and the data integrity information obtained from an upper layer system of the RAID.

19. The computer program product of claim 17, wherein the machine executable instructions which, when executed, further causing the machine to perform a method for monitoring health condition of a hard disk:

wherein before obtaining the characteristics associated with the hard disk:
pre-collecting the characteristics periodically or according to a trigger by an event; and
storing the characteristics.

20. The computer program product of claim 19, wherein determining the health condition of the hard disk based on the characteristics comprises at least one of:
determining the health condition of the hard disk periodically based on the characteristics; OR
determining the health condition of the hard disk based on the characteristics according the trigger by an event.

* * * * *